July 31, 1928.
A. G. EGBERT
1,678,936
POULTRY SCALDING MEANS
Filed Nov. 15, 1927   2 Sheets-Sheet 1
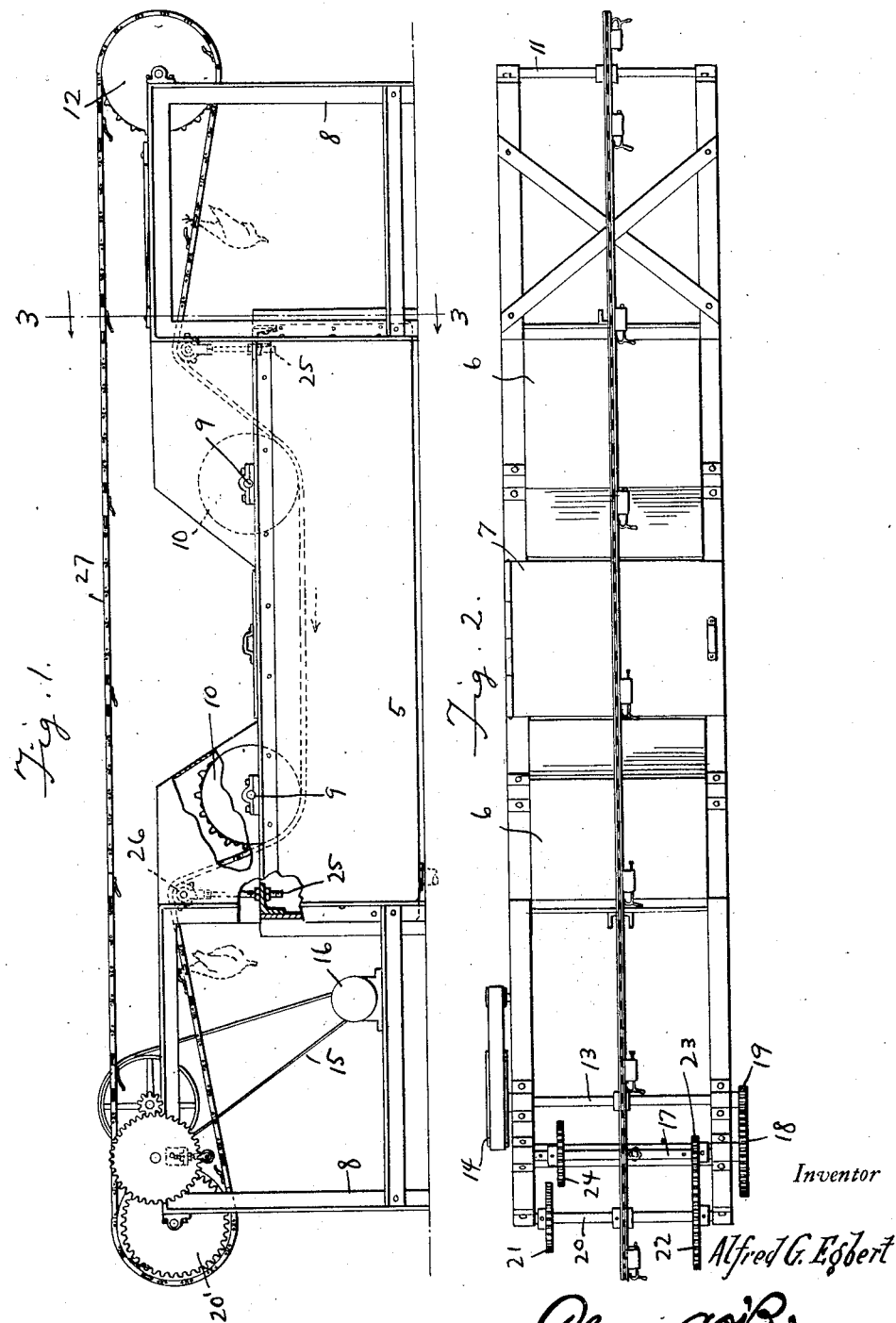
Inventor
Alfred G. Egbert
By Clarence A. O'Brien
Attorney July 31, 1928.
A. G. EGBERT
1,678,936
POULTRY SCALDING MEANS
Filed Nov. 15, 1927
2 Sheets-Sheet 2
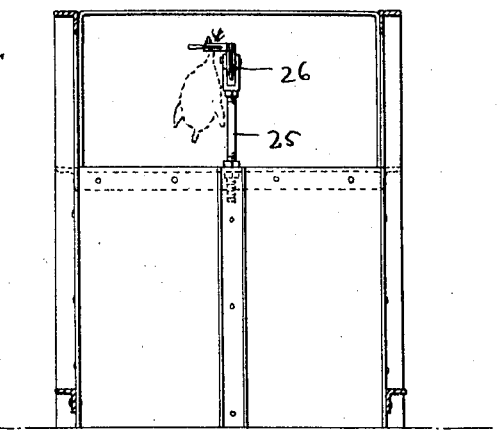
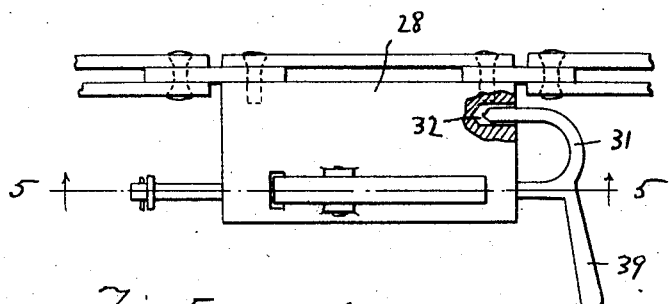
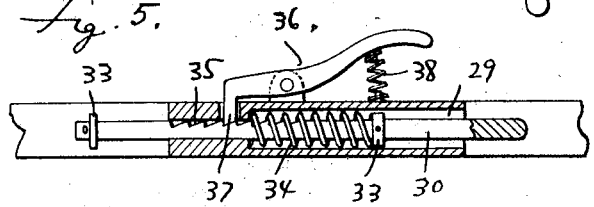
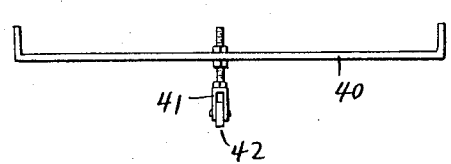
Inventor
Alfred G. Egbert
By Clarence A. O'Brien
Attorney Patented July 31, 1928.

1,678,936

UNITED STATES PATENT OFFICE.

ALFRED G. EGBERT, OF PLEASANTON, KANSAS.

POULTRY-SCALDING MEANS.

Application filed November 15, 1927. Serial No. 233,476.

This invention relates to new and useful improvements in scalding machines for poultry and aims to provide a highly novel, simple and efficient mechanism whereby chickens after they have been stuck for bleeding may be carried into a tank of scalding water and caused to move at a predetermined speed therethrough. Through reason of the present structure the poultry are pulled through the scalding tank feet first so that the water will work under the feathers which will of course permit of the rapid picking of the fowl after the same move from the scalding tank.

One of the most important objects of the invention is to provide means whereby the chickens may be rapidly secured by their feet to an endless chain structure that passes through the scalding tank, and wherein the clamping mechanism is automatically released after the poultry passes from the tank so as to permit of the proper operation of the machine without any shut down.

In the drawings wherein like reference characters indicate corresponding parts throughout the several views:

Figure 1 is a side elevation partly in cross section of my improved poultry scalding machine.

Figure 2 is a top plan view thereof,

Figure 3 is a detail vertical section taken substantially upon the line 3—3 of Figure 1.

Figure 4 is a plan view of a portion of the endless chain mechanism that is equipped with a plurality of chicken clamping units, one of which is disclosed in said Figure 4.

Figure 5 is a detail longitudinal section through the clamping mechanism taken substantially upon the line 5—5 of Figure 4, and Figure 6 is an elevation of a trip device adapted for engaging the clamps for causing the automatic releasing of the fowl therefrom.

Now having particular reference to the drawings, my novel machine consists of a relatively elongated scalding tank 5, the top of which is formed or constructed with hood members 6—6 at opposite ends of the tank. Between these hoods the tank is open and is provided with a hinged lid 7 so that access to the interior of the tank may be had.

Constructed at opposite end of the tank 5 are relatively square shaped skeleton frames 8—8 of a height greater than that of the tank 5 and terminating at their upper ends in longitudinal alignment with the top walls of the tank hood 6—6.

Journaled transversely across the top of the tank 5 within each hood 6 is a shaft 9 to the center of which is keyed a sprocket wheel 10, said shafts and sprocket wheels being disclosed in full and dotted lines in Figure 1. The diameter of these sprocket wheels is such that the peripheries thereof enter the tank 5 as clearly disclosed in Figure 1.

Arranged transversely of one of the skeleton frames 8 is a shaft 11 to which is keyed a relatively large sprocket wheel 12. Journaled transversely of the other frame member 8 intermediate the ends thereof is a power shaft 13 one end of which is provided with a belt pulley 14 to facilitate the rotation of this shaft through the medium of an endless belt 15 that extends downwardly into the frame 8 and that is trained over a pulley upon the adjacent end of the armature shaft of an electric motor 16 suitably supported within said skeleton frame 8. Directly in back of the shaft 13 and parallel therewith is a further shaft 17 equipped at the end remote from the belt pulley 14 of the shaft 13 with a relatively large spur gear 18 that meshes with a smaller spur gear 19 upon the adjacent end of said shaft 13.

In back of this shaft 17 is a still further transverse shaft 20 that is equipped adjacent opposite ends with spur gears 21 and 22 of differing diameters. The shaft 17 is equipped adjacent its ends with spur gears 23 and 24, also of differing diameters and complementary to the spur gears 21 and 22 of the shaft 20. These gears 23 and 24 may be keyed upon the shaft 17 out of engagement with the gears 21 and 22 for either of said gears 23 and 24 may be keyed upon the shaft in engagement with its corresponding gear of the shaft 20 with the obvious result that different speeds of the shaft 20 may be received. Vertically adjustably secured to angle bars within the top of the tank 5 at opposite ends thereof are vertical posts 25, the post at each end of the tank being directly in back of the adjacent sprocket wheel 10. The upper ends of these posts 25 project above the periphery of each sprocket wheel and each post is equipped at its upper end with a small sprocket 26. Trained around the gear 12 of the frame shaft 11 and around a sprocket gear 20' keyed intermediate the ends of the shaft 20 of the opposite frame 8 is a longitudinally extending sprocket chain 27, which sprocket chain is extended to engage over the sprocket 26 of the vertical post 25 and beneath the sprocket 10 of the tank shafts 9.

At predetermined points throughout the length of this endless chain 27 the same is equipped with laterally extending rectangular plates or blocks 28. Each block is formed at its outer edge with a longitudinally extending bore 29 movable through which is an elongated pin 30. The opposite end of this pin 30 projects through the bore while one end of said pin is bent inwardly and then reversely to provide a hook 31, the end of the innermost portion of which is adapted for engagement within a socket 32 in the adjacent end of the plate or block as clearly indicated in Figure 4. The opposite end of each pin 30 carries an abutment 33 to prevent the disengagement of the pin from the bore of the plate or block. The end of the bore 29 adjacent the hook 31 of said pin is of enlarged diameter and secured to the pin within this enlarged portion of the bore is a collar 33. While surrounding the pin between the collar and the shoulder formed by the inner end of the enlargement is an expansible coil spring 34 for the purpose of normally forcing the pin 30 in a direction toward the right so as to release the hook 31 from the plate or block 23.

The top surface of the pin 30 is formed throughout a portion of its length with teeth 35, while pivoted to the top surface of the plate or block 28 is a latch lever 36 that extends longitudinally with respect to the plate and that is formed at one end with a depending latch tongue 37 engageable through an opening in the block or plate that registers with the pin bore so that said tongue will engage the teeth 35 of the pin when the hooked end 31 is forced inwardly against the action of the spring 34 to receive said hook 31 in locked engagement with the plate 28. Obviously the legs of the chickens are to be arranged within the hook 31 after which the hook is forced inwardly into locking engagement with the plate or hook. Arranged between the outer end of the latch lever 36 and the plate or block 28 is an expansible coil spring 38 for normally maintaining the latch lever in position for automatic engagement with the teeth of the pin when said pin is forced inwardly. In order to facilitate the inward movement of the pin, said hook 31 thereof is formed with an outwardly extending handle 39.

Arranged within the top of the skeleton frame 8 carrying the shaft 17 and beneath said shaft 17 is a bar 40 equipped intermediate its ends with a depending roller hanger 41 within the lower end of which is a roller 42. As clearly indicated in Figure 1 the latch lever 36 of the poultry clamping unit is adapted for engagement with this roller 42 for automatically releasing the latches as the clamping units pass beneath the roller whereupon the pins 30 of the clamping members are also released, whereupon the poultry will drop therefrom.

It will be apparent also from Figure 1 that the poultry are engaged with the clamping members at a point within the foremost skeleton frame 8, and that the travel of the endless chain 27 in the direction of the arrow upon the scalding tank in Figure 1 will cause the movement of the fowl downwardly into and thence longitudinally through the tank, feet first, so that they will be properly scalded.

Having thus described the invention, what I claim as new and desire to secure by Letters Patent is:—

1. In a poultry scalding machine of the character described, a scalding tank, an endless member associated with the tank and having one run thereof engageable through said tank, means for operating said endless member, means whereby poultry may be readily secured to and removed from said endless member, said means consisting of blocks secured to the member, a pin longitudinally slidable through each block, a hook at one end of the pin between which and the adjacent end of the block the legs of the fowl are to be arranged, means for securing the pin at a position within the block whereby the hooked end of the pin is arranged adjacent the block, and cooperative construction between each clamp and the machine and the far end of the tank whereby the said pins are automatically released after the same have passed from said scalding tank.

2. In a poultry scalding machine of the character described, a scalding tank, an endless member associated with the tank, and having one run thereof engageable through said tank, poultry securing devices carried by the endless member, said devices each including a block adapted to be secured to the endless member, a slidable member on said block provided with a hooked end, spring means for normally maintaining said member projected from said block, and latch means for maintaining said hooked member in retracted position.

3. In a poultry scalding machine of the character described, a scalding tank, an endless member associated with the tank and having one run thereof engageable through said tank, poultry securing devices carried by the endless member, said devices including blocks adapted to be secured to the endless member at predetermined intervals, each of said blocks being provided with a slidable member, a hook provided at the outer end of said slidable member, spring means associated with said slidable member for normally maintaining the same projected from said block, and latch means for maintaining said hooked member in retracted position, said means consisting in forming the hooked member with teeth, and a pivotal lever on the block adapted to engage the teeth of said hooked member.

In testimony whereof I affix my signature.

ALFRED G. EGBERT.